US008749983B2

(12) United States Patent
Vandiver et al.

(10) Patent No.: US 8,749,983 B2
(45) Date of Patent: Jun. 10, 2014

(54) PORTABLE ADJUNCT DEVICE FOR PORTABLE ELECTRONIC DEVICES

(75) Inventors: Jesse Vandiver, Oxnard, CA (US); Christopher McSweyn, Oxnard, CA (US); Jack Debiasio, Oxnard, CA (US); Kasidy Alves, Oxnard, CA (US); Vince Alves, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 440 days.

(21) Appl. No.: 13/098,353

(22) Filed: Apr. 29, 2011

(65) Prior Publication Data

US 2012/0275118 A1   Nov. 1, 2012

(51) Int. Cl.
*H05K 7/00*   (2006.01)
(52) U.S. Cl.
USPC .......................................... 361/728; 361/729
(58) Field of Classification Search
USPC .......................... 361/728–730, 752, 796, 800
See application file for complete search history.

(56) References Cited

U.S. PATENT DOCUMENTS

| | | | | |
|---|---|---|---|---|
| 5,859,523 A | * | 1/1999 | Nierescher et al. | 320/111 |
| 6,334,788 B1 | * | 1/2002 | Sakaguchi et al. | 439/528 |
| 6,528,969 B2 | * | 3/2003 | Tung et al. | 320/103 |
| 6,898,080 B2 | * | 5/2005 | Yin et al. | 361/679.41 |
| 7,106,858 B2 | * | 9/2006 | Goldberg | 379/450 |
| 7,583,054 B1 | * | 9/2009 | Harris | 320/107 |
| 7,746,029 B2 | * | 6/2010 | Toya | 320/107 |
| 7,909,624 B2 | * | 3/2011 | Iida | 439/131 |
| 7,933,130 B2 | * | 4/2011 | Shih | 361/810 |
| 7,952,569 B2 | * | 5/2011 | Hunt et al. | 345/179 |
| 2009/0102414 A1 | * | 4/2009 | Fowler | 320/101 |

* cited by examiner

*Primary Examiner* — Hung S Bui
(74) *Attorney, Agent, or Firm* — Arent Fox LLP

(57) ABSTRACT

Disclosed is a portable adjunct device that includes a case having a first recess and a second recess. Mounted in the first recess is a docking connector movable between closed and open positions. Detachably mounted in the second recess is a universal serial bus connector operably connected to the docking connector. The case defines a chamber and a battery operably connected to the docking connector is disposed in the chamber.

20 Claims, 4 Drawing Sheets

PORTABLE ADJUNCT DEVICE FOR PORTABLE ELECTRONIC DEVICES

BACKGROUND

1. Field

The disclosure relates electronic arts. In particular, it relates to a portable adjunct device for use with portable electronic devices, such as portable media players.

2. Background

The dependence of people on an enormous variety of portable electronic devices for both business and personal use is continuously expanding. The portability of these devices allows users to communicate or enjoy music and video. However, with portability comes the concomitant need to be able to recharge the portable electronic device and to be able to sync the portable electronic device with other electronic devices.

For example, although improving battery technology has played a big part in this transformation, the inevitable battery recharge is still a very pertinent aspect of any portable device. Recharging portable media players is typically accomplished under the docking station concept. A portable media player is placed into a docking station device (docked) and the docking station device is separately plugged into a power source. Particularly for travelers, this means traveling, not only with the primary device itself, but also packing up a docking station device and for plugging the docking station device into a power source.

Additionally, particularly for a traveler, there is a need for a more compact universal serial bus (USB) cable device that can be transported and easily be a user and that eliminates the tangle and hassle of loose wires.

Accordingly, there is a need for portable adjunct devices for electronic devices. There is a still further need for portable adjunct devices that are compact, portable and have a minimum of parts, so they can easily be stowed for transport. And there is a still further need for portable adjunct devices that can be easily docked and synced with a portable electronic device.

SUMMARY

Now in accordance with certain aspects of the invention there has been discovered a portable adjunct device formed of a case having a first recess and a second recess. Mounted in the first recess is a docking connector movable between closed and open positions. In some aspects, the docking connector is rotatably mounted in the first recess. And in some embodiments, the docking connector is a 30 pin connector.

Detachably mounted in the second recess in the case is a USB connector operably connected to the docking connector. In some aspects, the second recess includes a magnet for detachably mounting the USB connector. And in some aspects, the USB connector is operably is connected to the docking connector using a USB cable.

The case defines a chamber and a battery operably connected to the docking connector is disposed in the chamber. In some aspects, a battery level indicator, operably connected to the battery, is disposed on a surface of the case. In some of these aspects, the battery level indicator provides a visual indication of the battery level. And in some aspects, the battery level indicator is a plurality of lights. In some aspects, a carabineer is attached to the case In some aspects, the case has a back case surface, an opposing front case surface, a top case surface, an opposing bottom case surface, a first case side surface and an opposing second case side surface, the case defining a chamber. In some of these aspects, the first recess is defined by a recess back surface, a first recess side surface, an opposing second recess side surface and a recess bottom surface. In some aspects, the docking assembly includes a connector portion and a base portion and the base portion includes opposing base back and front surfaces. In some of these aspects, the base front surface abuts the first recess back surface when the docking assembly is in the closed position and the base back surface abuts the first recess back surface when the docking assembly is in the open position.

In some aspects, the second recess is formed in one of the case side surfaces. And is some aspects, a universal serial bus cable aperture is formed on the bottom surface and a universal serial bus cable groove is formed on the side surface containing the second recess. In some of these aspects, the universal serial bus groove aperture extends from the universal serial bus aperture to the second recess.

BRIEF DESCRIPTION OF THE DRAWINGS

Various aspects of the present invention are illustrated by way of example, and not by way of limitation, in the accompanying drawings, wherein.

DETAILED DESCRIPTION

Figure 1:
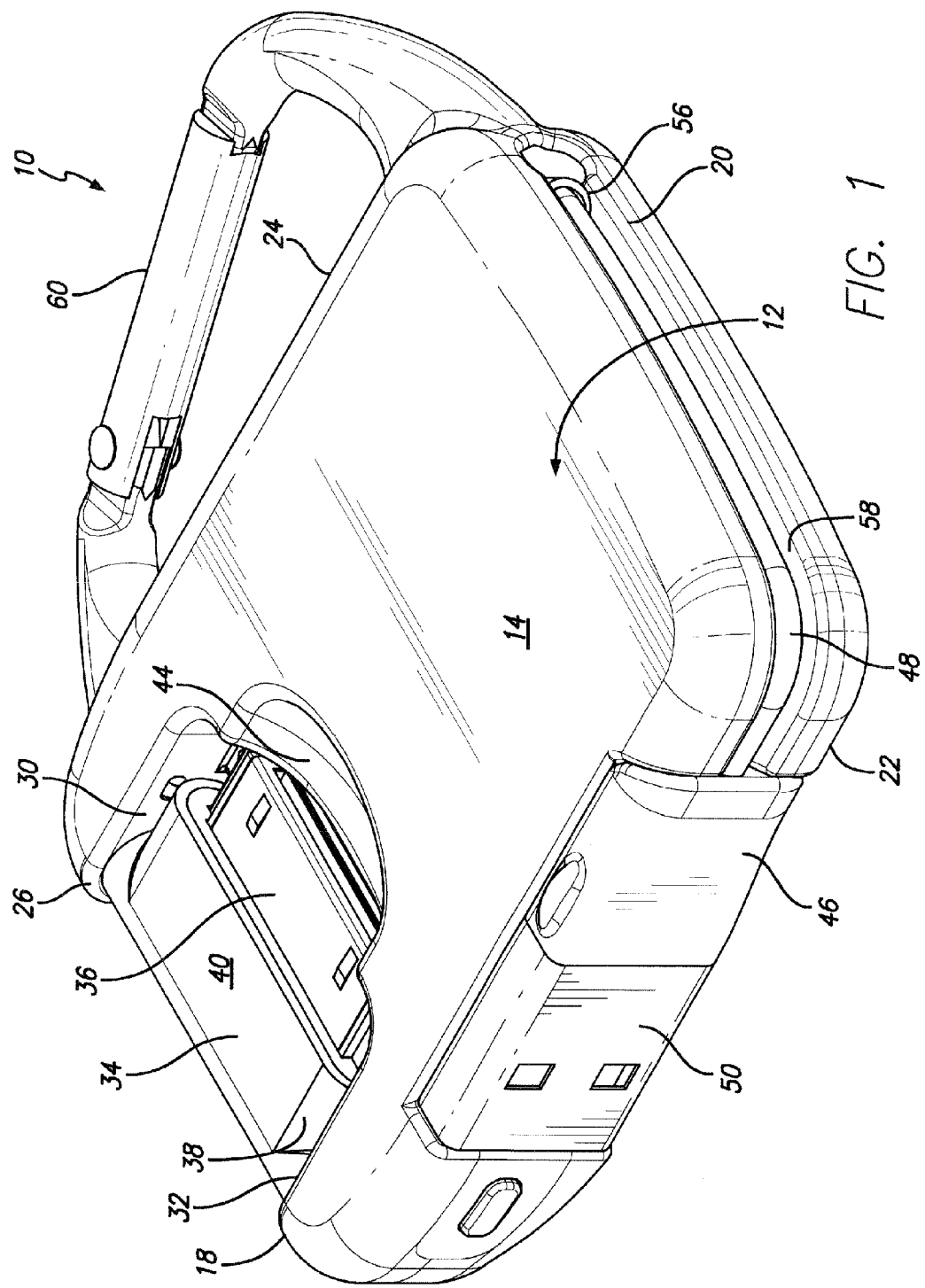
FIG. 1 back perspective view of one aspect of a portable adjunct device showing, among other things, an electronic device docking connector in a closed position and a USB cable in an attached position in accordance with the disclosure.

The detailed description set forth below in connection with the appended drawings is intended as a description of various embodiments of the present invention and is not intended to represent the only embodiments in which the present invention may be practiced. In describing any of these embodiments, the term "exemplary" may be used, which means "serving as an example, instance, or illustration," and should not necessarily be construed as preferred or advantageous over other embodiments disclosed herein. The detailed description includes specific details for the purpose of providing a thorough understanding of the present invention. However, it will be apparent to those skilled in the art that the present invention may be practiced without these specific details. For example, while specific reference is made to portable media players, it can be appreciated that the process is of equal utility in charging other portable electronic devices, such as cell phones, tablet notebooks and the like.

Relative term such as "back" and "front," "top" and "bottom" and "side" are used herein to describe one element's relationship to another element illustrated in the drawings. It will be understood that these are relative terms intended to encompass different orientations of the portable adjunct device in addition to the orientation depicted in the drawings. By way of example, if a portable adjunct device is turned over, elements described as being on the "top" would then be oriented on the "bottom." The term "bottom" can, therefore, encompass both an orientation of "bottom" and "top" depending on the particular orientation of the apparatus.

Figure 2:
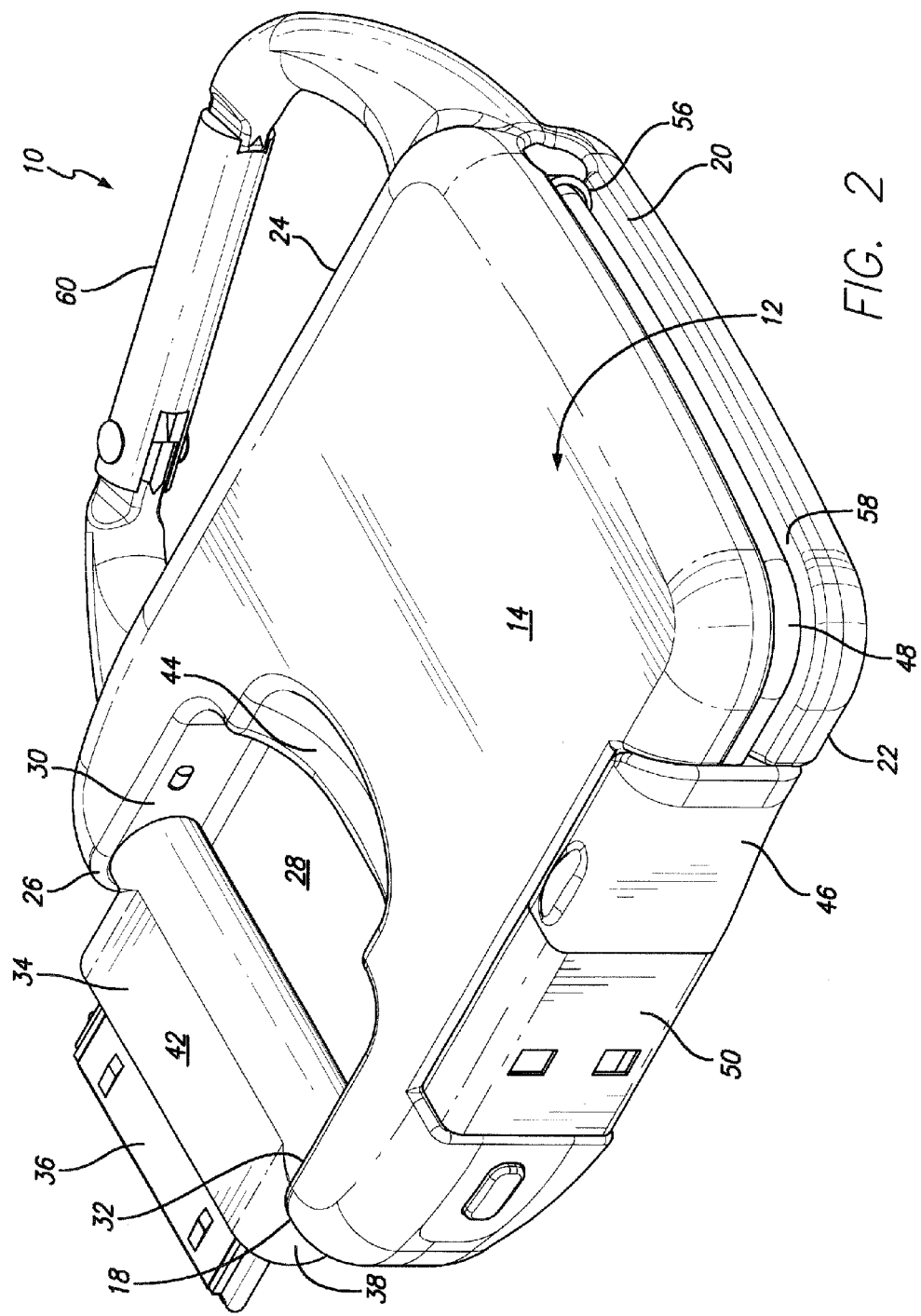
FIG. 2 is an illustration of the portable adjunct device of FIG. 1 showing, among other things, an electronic device docking connector in a fully open position.

Referring to FIGS. 1 and 2, there is shown back and front perspective views of one aspect of a portable adjunct device 10 in accordance with the disclosure. The portable adjunct device includes a case 12, with reduced depth, having a substantially rectangular cross-section with rounded corners and beveled edges. The case has a back case surface 14, an opposing front case surface 16 (FIG. 4), opposing top and bottom case surfaces, 18 and 20, respectively, and opposing first and second case side surfaces, 22 and 24, respectively, substantially perpendicular to the back and front case surfaces. In some aspects, the back case surface and the front case surface are planar and substantially parallel to one another.

The case can be made from any suitable non-conductive material. The case can be formed by a combination of two molded shells or any other method of forming an enclosure. In some aspects, the case has a textured finish to facilitate handling by a user of the portable adjunct device.

A first recess 26 is formed in the top back portion of the case. As best seen in FIG. 2, the first recess is defined by a back recess surface 28 and opposing first and second recess side surfaces 30 and 32, respectively. In some aspects, at least a portion of the front recess surface is planar and in some aspects at least a portion of the front recess surface is substantially parallel to the front case surface 16. In some aspects, at least a portion of the first and second recess side surfaces are planar and in some aspects at least a portion of the first and second recess side surfaces are substantially parallel to the first and second case side surfaces 24 and 26.

A docking connector 34 is mounted in first recess. The docking connector 34 can be any connector for docking with portable electronic devices. In some aspects, where the portable electronic device is a portable media player, the docking connector is a thirty pin connector with a select number of pins dedicated to supplying an electrical charge to the portable media player battery when docked. Representative docking connectors, include without limitation, a 30 pin connector of the type typically used as a dock connector for an IPOD® or an IPAD® or an IPHONE®.

The docking connector is mounted, such that it can be rotated between closed and open positions. In some aspects, the docking connector contains a connector portion 36 and a base portion 38 and the base portion is rotabably mounted to the first and second recess side surfaces 30 and 32. In some of these aspects, the base portion includes opposing back and front docking connector surfaces 40 and 42 and in some aspects the back and front docking connector surfaces are substantially parallel to the back recess surface 28.

As seen in FIG. 1, when in the closed position, the docking connector 34 does not extend above either the top case surface 18 or the back case surface 14. In some aspects, in the closed position, the front docking connector surface 40 abuts the back recess surface 28, so that the docking connector securely rests in the recess.

As seen in FIG. 2, when in the open position, the docking connector 34 extends beyond the top case surface 18. In some aspects, to enhance the stability of the connection when the portable adjunct device is docked with the portable electronic device, the back docking connector surface 42 abuts a portion of the back recess surface 28 when the docking connector is in the fully open position. Because the docking connector is rotatable through a wide range of positions, a user's ability to dock the portable adjunct device with the portable electronic device is facilitated.

In certain aspects, an indented portion 44 of the first recess 26 extends beyond the docking connector 34, when the docking connector is in the closed position. The portion is dimensioned so that a tip of a user's finger can be slipped between the recess and the docking connector and, thus, to facilitate rotation of the docking connector between the closed and open positions.

In some aspects, a USB cable connector 46 is detachably secured to the portable adjunct device. The USB cable connector includes a USB cable 48 and a USB connector 50. And in some aspects, the USB cable is a shielded cable having two wires, a power and a ground wire for delivering power from the device to be synced (not shown) and a braided pair of wires for carrying data to and from the device to be synced. One end of the cable is connected to the USB connector, while the other end is operably connected to the docking connector 34.

Figure 3:
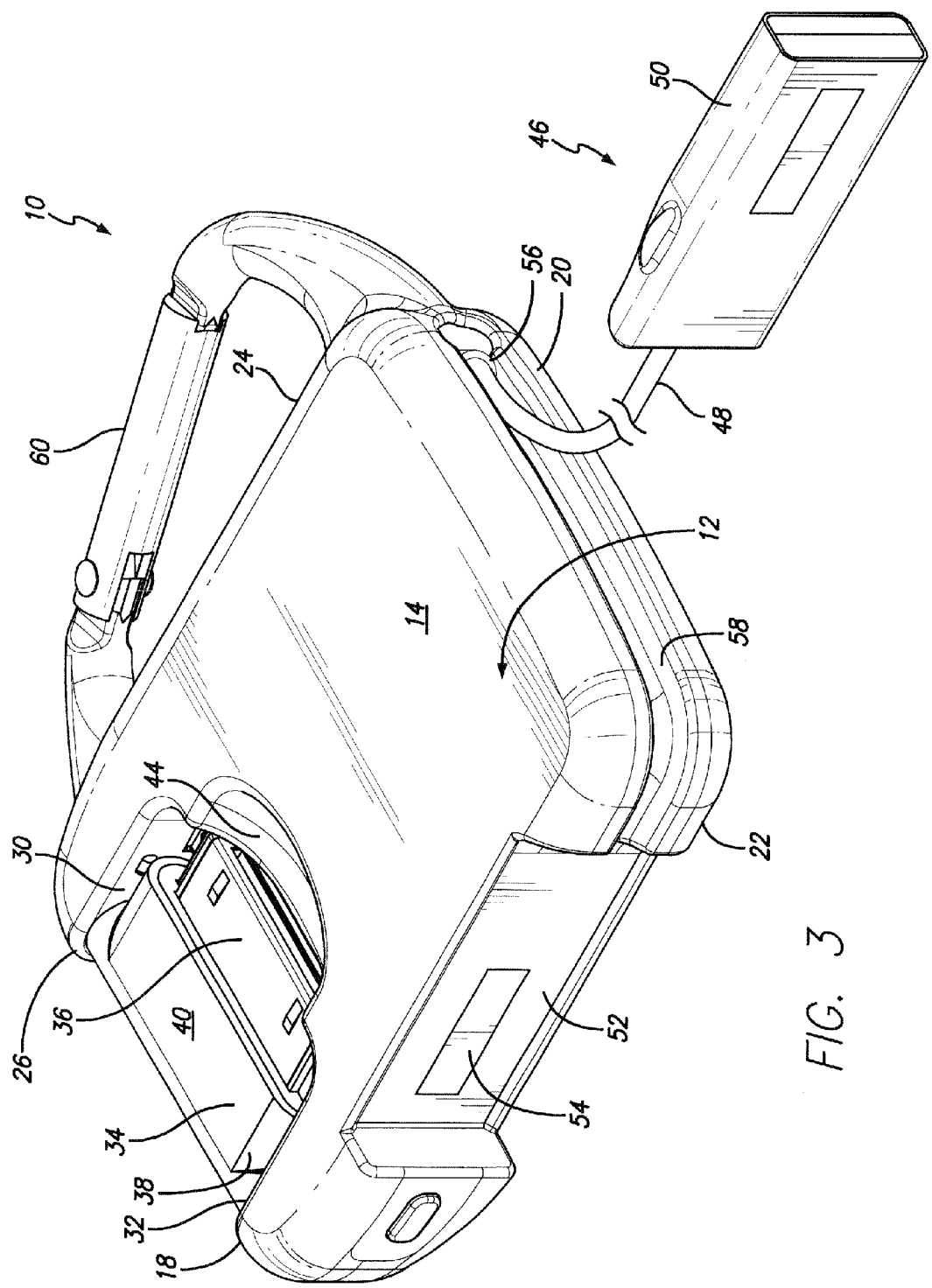
FIG. 3 an illustration of the portable adjunct device of FIG. 1 showing, among other things, a USB cable in a detached position.

Turning additionally to FIG. 3, it can be seen that, in some aspects, the portable adjunct device 10 includes a second recess 52. As seen in FIG. 3, in some aspects, the second recess is formed in the first case side surface 22. The second recess is dimensioned to contain the USB connector 50. The USB connector can be attached to the second recess by any suitable means. In an aspect shown in FIG. 3, the USB connector is releasably attached by a magnet 54 disposed in the recess.

As best seen in FIG. 3, an aperture 56 spaced apart from the second recess is formed in the case and a groove 58 extends from the aperture to the end of the second recess 52 closest to the aperture. In some aspects, the aperture is located in the bottom surface 20 near the second case side surface 24 and the groove is dimensioned to contain the USB cable 48.

Additionally, in some aspects, the portable adjunct device 10 includes a carabineer 60. With the carabineer, a user can easily attach to the portable adjunct device to belt, a backpack and the like. In an aspect shown in FIG. 3, the carabineer is formed on the second case side surface 24.

Figure 4:
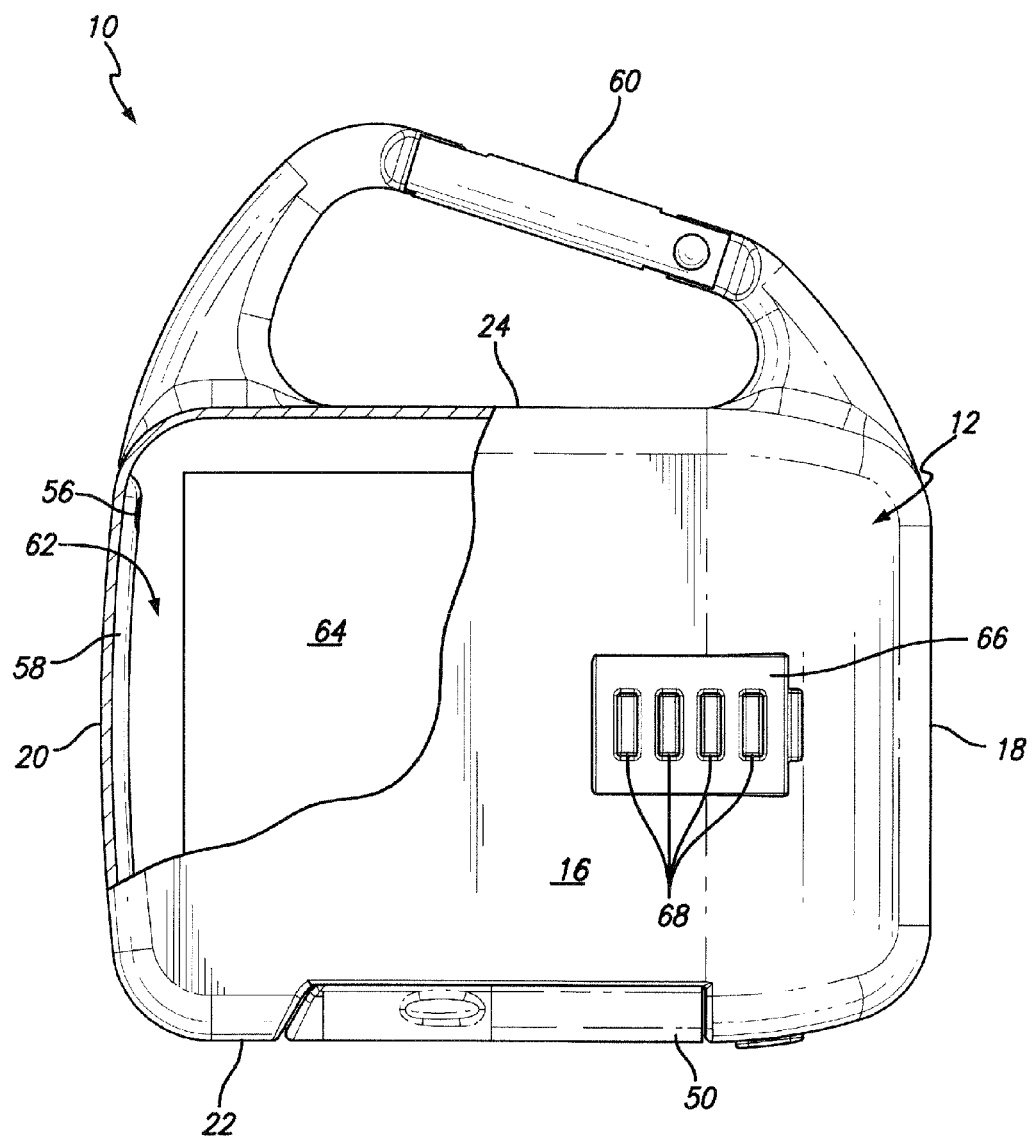
FIG. 4 is a front plan view, partially cut away, of the portable adjunct device of FIG. 1.

Turning now to FIG. 4, there is shown is a front plan view, partially cut away, of an aspect of the portable adjunct device 10. A battery chamber 62 is formed in at least a portion of the case 10. A battery 64, operably connected to the docking connector 34, is disposed in the battery chamber. The battery provides electrical current to the docking connector, in order that the portable adjunct device can charge the battery of an electronic device. Any suitable battery can be used and the choice of battery will depend on the electronic device to be recharged. In some aspects, the battery produces a current of 5V.

In an aspect of the invention, the portable adjunct device includes a battery level indicator 66 disposed on the front case surface and operably connected to the battery. As shown in FIG. 3, in some aspects, the battery level indicator provides a visual indication of the battery level. And in some of these aspects, the battery indicator includes a plurality of lights 68, including without limitations, LED lights. The greater the battery level, the more lights that are lit.

The compact design allows for easy stowing and transport of the portable adjunct device in a manner that also prevents tearing and snagging. The portable adjunct device can alternatively be formed in many shapes and sizes in response to, for example, market demand or future portable media device configurations.

The portable battery charger is compact and portable so that it can easily be stowed for transport, greatly enhancing a consumer's ability to recharge the battery of an electronic device, such as a portable media player, without all of the problems associated with recharging, including the associated wires or cables that inevitably accompany a docking station device.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A portable adjunct device comprising:
   a case having
      a first recess in the case,
         a docking connector for a portable electronic device mounted in the first recess, the docking connector movable between closed and open positions,
      a second recess in the case; and
         a universal serial bus connector detachably mounted in the second recess, the universal serial bus connector operably connected to the docking connector; and
      a chamber defined by the case,
         a battery disposed in the chamber, the battery operably connected to the docking connector.

2. The portable adjunct device of claim 1 wherein the docking connector is rotatably mounted in the first recess.

3. The portable adjunct device of claim 1 wherein a portion of the first recess extends beyond the docking connector, when the docking connector is in the closed position.

4. The portable adjunct device of claim 1 wherein the second recess includes a magnet for detachably mounting the universal serial bus connector.

5. The portable adjunct device of claim 1 wherein the docking connector is operably connected to the universal serial bus connector with a universal serial bus cable.

6. The portable adjunct device of claim 1 further comprising a battery level indicator disposed on a surface of the case, the battery level indicator operably connected to the battery.

7. The portable adjunct device of claim 6 wherein the battery level indicator provides a visual indication of the battery level.

8. The portable adjunct device of claim 7 wherein the battery level indicator includes a plurality of lights.

9. The portable adjunct device of claim 1 wherein the docking connector is a 30 pin connector.

10. The portable adjunct device of claim 1 further comprising a carabineer attached to the case.

11. A portable adjunct device comprising:
    a case having a back case surface, an opposing front case surface, a top case surface, an opposing bottom case surface, a first case side surface and an opposing second case side surface, the case defining a chamber,
       a first recess in the case,
          a docking connector for a portable electronic device rotatably mounted in the first recess, the docking connector rotatable between closed and open positions,
       a second recess in the case, and
          a universal serial bus connector detachably mounted in the second recess, the universal serial bus connector operably connected to the docking connector; and
       a chamber defined by the case,
          a battery disposed in the chamber, the battery operably connected to the docking connector.

12. The portable adjunct device of claim 11 wherein the first recess is formed in the back case surface and the top case surface and wherein the first recess is defined by a recess back surface, a first recess side surface, an opposing second recess side surface and a recess bottom surface.

13. The portable adjunct device of claim 12 wherein a portion of the recess bottom surface extends beyond the docking connector, when the docking connector is in the closed position.

14. The portable adjunct device of claim 12 wherein the docking assembly includes a connector portion and a base portion, wherein the base portion includes opposing base back and front surfaces and wherein the base front surface abuts the first recess back surface when the docking assembly is in the closed position and the base back surface abuts the first recess back surface when the docking assembly is in the open position.

15. The portable adjunct device of claim 11, wherein the docking connector is a 30 pin connector.

16. The portable adjunct device of claim 11 wherein the second recess is formed in one of the first or the second case side surfaces.

17. The portable adjunct device of claim 16 wherein the second recess includes a magnet for detachably mounting the universal serial bus connector.

18. The portable adjunct device of claim 15 further comprising a universal serial bus cable aperture formed on the bottom surface and a universal serial bus cable groove formed on the side surface containing the second recess, the universal serial bus cable groove extending from the universal serial bus aperture to the second recess.

19. The portable adjunct device of claim 11 further comprising a battery level indicator disposed on a surface of the case, the battery level indicator operably connected to the battery.

20. The portable adjunct device of claim 11 further comprising a carabineer attached to the case.

* * * * *